United States Patent
Remy (10) Patent No.: US 11,692,481 B1
(45) Date of Patent: Jul. 4, 2023

(54) INERTIAL PARTICLE SEPARATOR DUCT ASSEMBLY WITH SPLITTER

(71) Applicant: PRATT & WHITNEY CANADA CORP., Longueuil (CA)

(72) Inventor: Patrice Remy, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/661,374

(22) Filed: Apr. 29, 2022

(51) Int. Cl.
*F02C 7/052* (2006.01)

(52) U.S. Cl.
CPC ................... *F02C 7/052* (2013.01)

(58) Field of Classification Search
CPC .......... F02C 7/052; B64D 2033/0246
See application file for complete search history.

(56) References Cited

U.S. PATENT DOCUMENTS

| | | | | |
|---|---|---|---|---|
| 6,499,285 B1* | 12/2002 | Snyder | ................ | F02C 7/052 55/306 |
| 7,802,433 B2* | 9/2010 | Higgins | ................ | F02C 7/042 60/39.092 |
| 2017/0370287 A1* | 12/2017 | Pearson | ................ | F01D 9/02 |
| 2020/0332711 A1* | 10/2020 | Owen | ................ | F02C 7/052 |

* cited by examiner

*Primary Examiner* — Sabbir Hasan
(74) *Attorney, Agent, or Firm* — Norton Rose Fulbright Canada LLP (57) ABSTRACT

An inertial particle separator (IPS) duct assembly is disclosed having a duct having an inlet section extending downstream from an intake flow opening for receiving airflow to a junction, a scavenge flow section and a core flow section, the scavenge flow section and the core flow section splitting from the inlet section at the junction, the scavenge flow section having a scavenge flow outlet downstream of the junction, the core flow section having a core flow outlet downstream of the junction and fluidly connectable to the air intake of an engine core. A splitter cartridge is removably mounted at the junction, the splitter cartridge including a splitter body extending between a duct wall of the scavenge flow section and a duct wall of the core flow section.

14 Claims, 5 Drawing Sheets

INERTIAL PARTICLE SEPARATOR DUCT ASSEMBLY WITH SPLITTER

TECHNICAL FIELD

The application relates generally to aircraft engine air inlets, and more particularly to inertial particle separators (IPS) for such air inlets.

BACKGROUND

Inertial Particle Separators (IPS) are used in air inlets ducts of certain aircraft engines, and prevent or limit ingestion of dust, sand, debris, ice or other potentially damaging foreign particles into the core of the engine in operation. Such IPS may separate the inlet airflow stream into a core flow stream that is directed towards the engine, and a "dirty" flow stream which may be rejected and/or scavenged. A splitter of the IPS acts to split or bifurcate the inlet airflow stream into the core flow and scavenge flow streams. Once in service within an engine that is in use (e.g. on an aircraft), the splitter may become damaged or worn over time, e.g., due to impingement of particles of the flow, and may need to be replaced. Limited access to their location within the engine may render replacement or servicing of such splitters time consuming and costly. In another context, a number of IPS splitter geometries may be tested on test cells to assess performance. Manufacturing and/or replacement of test ducts with various design geometries may increase costs and test iteration cycle time.

SUMMARY

There is accordingly provided an inertial particle separator (IPS) duct assembly adapted to be fluidly connected to an air intake of an engine core of an aircraft engine, comprising: a duct having an inlet section extending downstream from an intake flow opening for receiving airflow to a junction, a scavenge flow section having a scavenge flow inlet in communication with the inlet section at the junction, a core flow section having a core flow inlet in communication with the inlet section at the junction, the scavenge flow section and the core flow section splitting from the inlet section at the junction, the scavenge flow section having a scavenge flow outlet downstream of the junction, the core flow section having a core flow outlet downstream of the junction and fluidly connectable to the air intake of the engine core; and a splitter cartridge removably mounted at the junction, the splitter cartridge including a splitter body extending between a duct wall of the scavenge flow section and a duct wall of the core flow section, the splitter body having a surface exposed to the airflow at the junction, the surface defining a leading edge of the splitter body extending in a direction transverse to the airflow at the junction.

The IPS duct assembly as defined above and described herein may further include one or more of the following features, on whole or in part, and in any combination.

In certain aspects, the surface has boundary lines extending there along, the boundary lines are aligned with respective ones of the duct wall of the scavenge flow section and the duct wall of the core flow section.

In certain aspects, the surface extends continuously from one of the boundary lines to the other one of the boundary lines.

In certain aspects, the splitter cartridge is mounted to the duct via a mounting assembly including a guide member engageable with the splitter cartridge, the splitter cartridge movable relative to the guide member, the guide member guiding the splitter cartridge in an axial movement of the splitter cartridge relative to the duct, the axial movement extending in the direction transverse to the airflow at the junction.

In certain aspects, the guide member is one of a rail and a bracket, the mounting assembly including another guide member being the other one of the rail and the bracket, the rail and the bracket in axial engagement along an axis extending along a length of the splitter body, one of the rail and the bracket coupled to the splitter body and the other one of the rail and the bracket coupled to a mounting wall of the duct.

In certain aspects, the rail and the bracket are in sliding engagement.

In certain aspects, the mounting wall of the duct extends between the duct wall of the scavenge flow section and the duct wall of the core flow section.

In certain aspects, the mounting assembly includes a rod secured to the duct, the rod extending through a hole in the splitter body of the splitter cartridge.

In certain aspects, the splitter cartridge includes a side plate, the splitter body extending from the side plate.

In certain aspects, the side plate includes a handle.

In certain aspects, the duct includes a side opening at the junction, the splitter body removably insertable in the duct through the side opening, and wherein the side plate closes the side opening of the duct.

In certain aspects, the duct includes a side opening at the junction, the splitter body removably insertable in the duct through the side opening.

In certain aspects, the splitter body extends along a full width of the duct at the junction.

In certain aspects, the IPS duct assembly includes a sealing gasket interfacing with the duct and the splitter cartridge.

There is also provided a splitter cartridge adapted to be mounted on an inertial particle separator (IPS) duct assembly including a duct, the splitter cartridge comprising: a splitter body elongated along a longitudinal axis, the splitter body having a first end and a second end, the splitter body having a surface extending from the first end to the second end, the surface having a convex profile and defining a leading edge extending from the first end to the second end; a guide member on the splitter body, the guide member cooperable with a guide member on the duct for guiding an axial movement of the splitter body along the longitudinal axis upon mounting the splitter cartridge to the duct.

The splitter cartridge as defined above and described herein may further include one or more of the following features, on whole or in part, and in any combination.

In certain aspects, the surface has boundary lines extending along the splitter body from the first end to the second end, the surface being continuous from one of the boundary lines to the other one of the boundary lines.

In certain aspects, the guide member on the splitter body includes at least one of a rail, a slot or a bracket.

In certain aspects, the splitter body of the splitter cartridge is a monoblock piece of material.

In certain aspects, the splitter cartridge includes a side plate coupled to the first end of the splitter body.

In certain aspects, the splitter cartridge includes a tightening device mounted on the side plate, the tightening device engageable with threads of a mounting rod of the IPS duct assembly for securing the splitter cartridge in the IPS duct assembly.

BRIEF DESCRIPTION OF THE DRAWINGS

Reference is now made to the accompanying figures in which.

DETAILED DESCRIPTION

Figure 1:
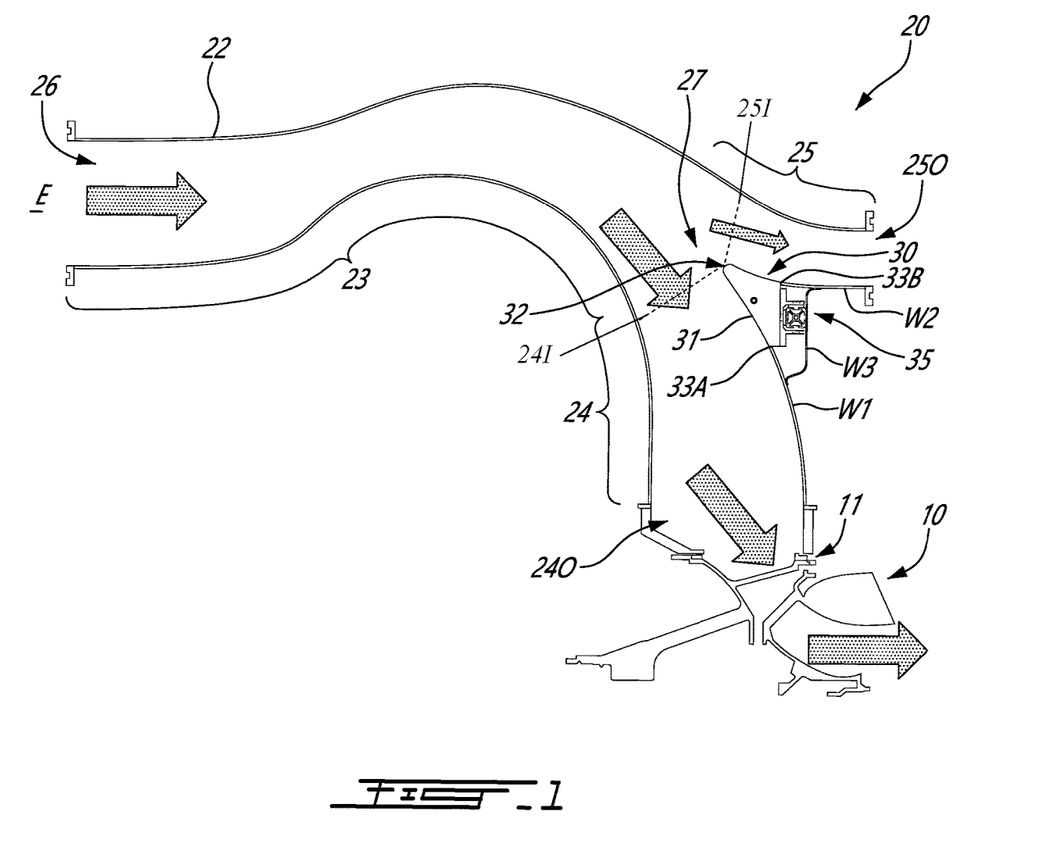
FIG. 1 is a schematic cross sectional view of an IPS duct assembly in fluid flow communication with an engine core.
Figure 1A:
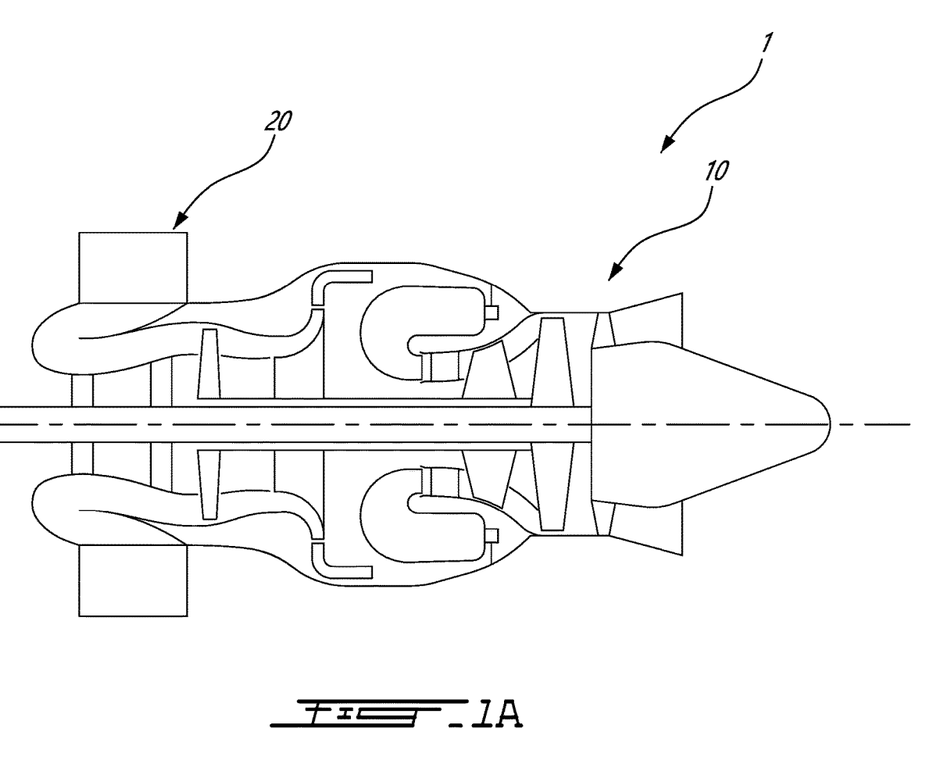
FIG. 1A a schematic cross-sectional view of an exemplary aircraft engine with the engine core and IPS duct assembly of FIG. 1.

FIG. 1 illustrates an inertial particle separator (IPS) duct assembly 20 fluidly connected to an engine core 10. The engine core 10 may be that of an aircraft engine 1 of a type preferably provided for use in subsonic flight. Non-limiting examples of such aircraft engine include turboprop and turboshaft engines, and ducted turbofan engines. The engine core 10 has a core air intake 11, which may receive at least part of the airflow ingested by the IPS duct assembly. The engine core 10 may include a housing, one or more engine shaft(s), rotor(s), ignition source(s), combustor(s), etc. The engine core 10 may include a compressor, with one or more compressor stages. The compressor may be in fluid communication with the core air intake 11 of the engine core 10 to receive the core intake airflow from the IPS duct assembly 20. A turbine section, with one or more turbine stages, may be downstream of the compressor. While the singular is used herein, there may be a plurality of core air intakes 11. For example, core intake airflow entering in the engine core 10 may come from one or more IPS duct assembly(ies) fluidly connected to one or more core air intakes 11.

Particles, including but not limited to sand, dust, liquids, ice or small debris, entering the engine core 10 are undesirable, as such particles may reduce the engine core life time, performance, and/or augment maintenance needs. The IPS duct assembly 20 may produce a fluid stream separation to channel at least part of the particles, debris of the airflow ingested by the IPS duct assembly 20 away from the engine core 10. It is understood that the core intake airflow is not necessarily free of particles and that a particle concentration of the core intake airflow may be less than that of the airflow entering the IPS duct assembly 20.

A schematic cross-section of the IPS duct assembly 20 according to an embodiment is illustrated at FIG. 1. The IPS duct assembly 20 includes a duct 22 having main or inlet section 23, a core flow section 24 for conveying core intake airflow to the engine core 10, and a scavenge flow section 25. These sections may also be viewed as inlet duct, core flow duct and scavenge flow duct, respectively. In other words, in at least some embodiments, the duct 22 may have separate duct segments forming respective ones of the afore-mentioned sections.

The inlet section 23 extends from an opening 26 which receives the airflow entering the IPS duct assembly 20. The inlet section 23 is downstream of the opening 26. The opening 26 defines the intake of IPS duct assembly 20, hence it may be referred to as the intake flow opening 26 of the IPS duct assembly 20. In at least some embodiments, the opening 26 is fluidly connected to the environment E outside the engine core 10 at ambient conditions (pressure and temperature). Alternately, the opening 26 may receive pressurized airflow from a pressurized air source. Through such opening 26 may enter the bulk of the airflow which will then feed the engine core 10. However, at least part of (if not all) such airflow entering the IPS duct assembly 20 will be separated (split) at a duct junction 27 (or simply "junction 27"), by a splitter 30 as will be explained in further detail below, between the core flow section 24 and the scavenge flow section 25 of the duct 22. At junction 27, the incoming airflow within the inlet section 23 is separated (split), and in this case bifurcated, into two or more downstream flow portions. More particularly, the incoming airflow within the inlet section 23 is separated (split) into two streams, one stream which is directed towards a core flow outlet 240 of the section 24 downstream of the junction 27 to reach the engine core inlet 11, and a second stream which is directed towards a scavenge flow outlet 250 of the section 25 downstream of the junction 27. Stated otherwise, the incoming airflow is separated by the splitter 30 at junction 27 into distinct flow streams downstream of the splitter 30, namely the core air flow stream entering the core flow section 24 at a core flow inlet 241 and the scavenge air flow stream entering the scavenge flow section 25 at a scavenge flow inlet 251. As shown, the core flow inlet 241 and the scavenge flow inlet 251 are located at the junction 27, and may be represented with a line tangent to the leading edge of the splitter 30 and normal to the flow stream passing through the core flow inlet 241 and the scavenge flow inlet 251, respectively.

The duct 22 is designed to impart momentum and trajectory to the particles as they flow from the inlet section 23 to the fluid junction 27. For example, turn(s) and/or curve(s) of the duct 22 in the inlet section 23 may impart a directional change to the particles. Such turn is illustrated in FIG. 1, as a single turn, for example. As can be seen, the duct 22 in the turn may have a constriction or cross-section reduction to accelerate the flow. The particles may, because of inertia, tend to gather outwardly, i.e., in a direction opposite to an apex, as they negotiate the turn in the inlet section 23. The particles (at least part thereof) may thus be extracted from the flow of air going to the engine core inlet 11, by channeling them out through the scavenge flow section 25 of the duct 22. The scavenge flow section 25 (outlet 250) may be in direct flow communication with the environment E at ambient pressure, or with a scavenge system receiving the scavenged airflow before being recirculated in the engine core 10 after filtering, as another possibility.

The splitter 30 is located at the junction 27. The splitter 30 is configured to separate (split) the incoming airflow into the first flow stream through the core flow section 24 and the second flow stream through the scavenge flow section 25. As will be described later, and as can be seen in FIG. 1, the splitter 30 is not integral with the duct 22. Stated otherwise, the splitter 30 is separate from the duct 22. According to the present disclosure, the splitter 30 is defined by a splitter cartridge 35 that is removably mounted within IPS duct assembly 20.

The splitter 30 has a surface 31 exposed to the airflow in the junction 27. The surface 31 defines a profiled shape of the splitter 30. Examples of profiled shape are shown in dotted lines in FIG. 3, in addition to the surface 31 drawn as a solid line. As can be seen, the surface 31 may define a generally acute corner. The surface 31 may be a convex profile surface. The surface 31 defines a leading edge 32 of the splitter 30. The leading edge 32 is the most upstream point of the splitter 30, as shown. The leading edge 32 extends in a direction transverse to the airflow at the junction 27 (into the paper when viewed on FIG. 1). The surface 31 extends between respective walls of the duct 22 in the core flow section 24 and the scavenge flow section 25. Those duct walls are shown at W1 and W2. As shown, the splitter 30 may define an extension of those walls W1 and W2, up to the leading edge 32. Stated otherwise, the surface 31 may mimic portions of the walls of the duct 22, with one portion extending from the leading edge 32 and forming a wall in the core flow section 24 and another portion extending from the leading edge 32 and forming a wall in the scavenge flow section 25. The surface 31, although generally convex, may have a curve in continuity with that of the walls W1 and W2, with such curve being concave between the leading edge 32 and a boundary line 33A, 33B of the surface 31 leading to the wall W1, W2. These boundary lines 33A, 33B of the surface 31 which extend along the surface in the same direction as that of the leading edge 32 are aligned/coextensive with the walls W1 and W2 for smooth transition at a junction therebetween. In at least some embodiments, the boundary lines 33 may contact the respective walls W1 and W2. The junction between the surface 31 and the walls W1, W2 may provide a very limited to no discontinuity so as to define a seamless, continuous, surface. The surface 31 may extend continuously from one wall W1 to the other wall W2, though it could be segmented. For example, the surface 31 may have a first surface segment extending between the wall W1 of the core flow section 24 and the leading edge 32, and a second surface segment extending between the wall W2 of the scavenge flow section 25 and the leading edge 32. The leading edge 32 may be an intersection between these first and second surface segments. While these segments may be physically distinct, such segments may be considered "virtual", in that the respective segments may refer to portions of a same continuous surface 31.

One challenge with the IPS duct assembly 20 is to maximize separation efficiency, which is the ratio of core flow to scavenge flow, while minimizing total pressure loss to the core flow going to the engine core 10. Computational fluid analysis may be performed to define profile geometries of the splitter 30 to be tested to assess the IPS duct assembly performance. Each of the profile geometries may be tested in test cells to determine their efficiency. Different materials for the splitter 30 may be tested instead of or in addition to the different profile geometries. In addition, a splitter, such as the splitter 30, part of an aircraft engine in service, may wear, for example due to impingement of particles of the flow over time. A replaceable splitter 30, which is not integral with the duct 22 may facilitate multiple testing and/or removal of the splitter 30 when worn. A splitter cartridge 35 defining the splitter 30, mounted to the duct 22, and removable from the duct assembly 20 is presented. As will be described in more detail with reference to the following figures, the splitter cartridge 35 is removably mounted to the duct 22 via a mounting assembly including a guide member guiding the splitter cartridge 35 in an axial movement of the splitter cartridge 35 relative to the duct 22.

Figure 2A:
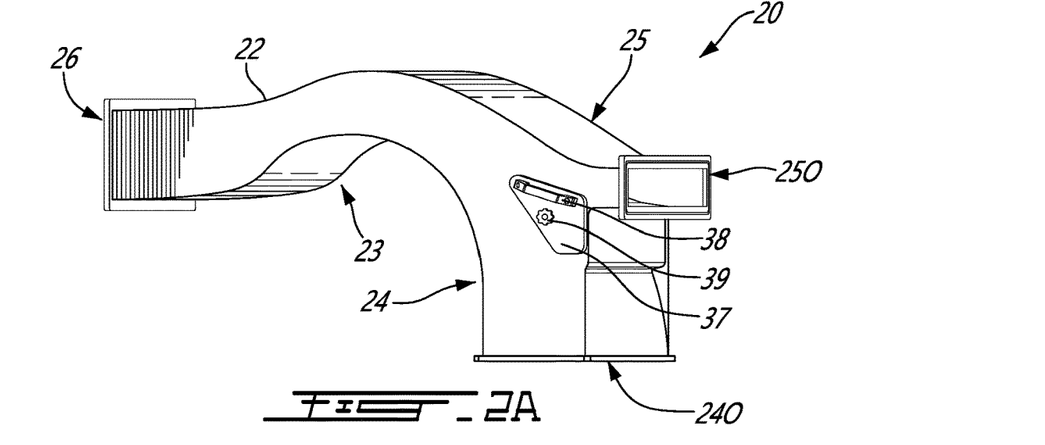
FIGS. 2A, 2B and 2C are perspective views of the IPS duct assembly of FIG. 1, including a removable splitter assembly, according to an embodiment.
Figure 2B:
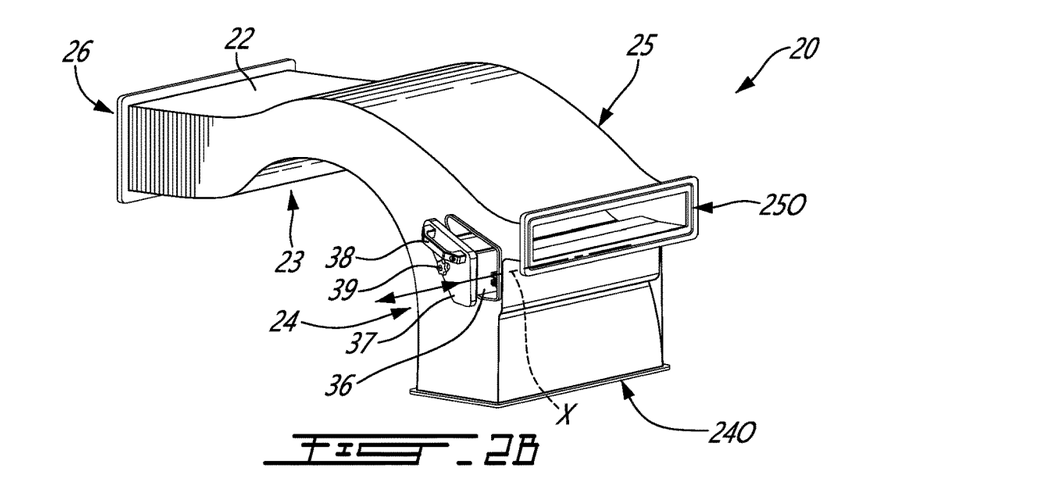
Figure 2C:
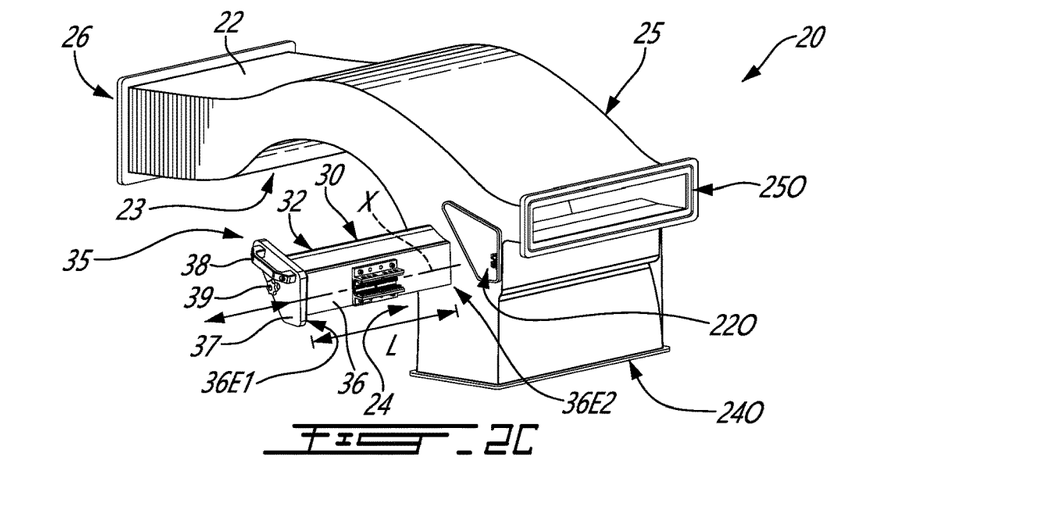

FIGS. 2A-2C shows the IPS duct assembly 20, which may form part of a test cell. The IPS duct assembly 20 includes the features described above referring to FIG. 1 and are not described again for conciseness. It is understood that the general shape of the IPS duct assembly 20 is simplified in the figures, in that embodiments of the IPS duct assembly 20 forming part of an aircraft engine may be shaped differently due to space limitations, for example.

The splitter 30 is shown as part of a splitter cartridge 35 removably mounted to the duct 22. The splitter cartridge 35 is a standalone unit with its own structure. The splitter cartridge 35 may be referred to as an insert embodying the splitter 30, movable into and out of the duct 22. Removal of the splitter cartridge 35 can be performed without disassembling the duct structure. The structural integrity of the duct 22 may not be affected by the removal of the splitter cartridge 35, as could be the case, for instance, if the splitter 30 were an integral part of a duct wall. The splitter cartridge 35 includes an elongated body, which may be referred to as a splitter body 36. The splitter body 36 defines the splitter 30 such as described above. The splitter body 36 is sized to extend along a full width of the duct 22. The leading edge 32 of the splitter 30 extends along a length L (or "longitudinal extent") of the splitter body 36. The splitter body 36 has its length L extending from a first end 36E1 to a second end 36E2 thereof. In at least some embodiments, the leading edge 32 extends along the full length L.

In at least some embodiments, the splitter body 36 is a monoblock piece of material. Such monoblock piece may be shaped by conventional machining. However, additive manufacturing techniques may be more cost efficient and/or practical. The splitter body 36 may be plain or at least partly hollowed to reduce weight. The splitter body 36 defines at least the surface 31 of the splitter 30. For example, in a variant, the splitter body 36 may be a plate shaped so as to define the surface 31 with the profiled shaped, and mounted to a frame. The splitter body 36 may have a lattice structure to maintain the structural integrity of the part, and a skin overlaying such lattice structure to define the surface 31, as another example.

In the depicted embodiment, the splitter body 36 extends from a side plate 37. The side plate 37 is coupled to the first end 36E1 of the splitter body 36. The side plate 37 of the splitter cartridge 35 may include a handle 38, such as shown, to facilitate handling. The side plate 37 may be integral with the splitter body 26, though being made as separate parts may be contemplated. This can be the case for the handle 38 as well. Also shown in FIGS. 2A-2C is a tightening device, here knob 39, mounted on the side plate 37. The knob 39 will be described later with other figures.

FIGS. 2A-2C show a sequence of axial movement positions of the splitter cartridge 35 being removably mounted to or unmounted from the duct 22. In the depicted embodiment, the duct 22 has a side opening 220 defined by a wall of the duct 22. The opening 220 is facing in a direction transverse to a flow path extending from the intake flow opening 26 to the scavenge flow outlet 260 and/or transverse to a flow path extending from the intake flow opening 26 to the core flow outlet 240. The splitter body 36 may engage the side opening 220 to penetrate the duct 22. As shown, insertion/extraction of the splitter body 36 may be made in a direction extending along its length L. Stated otherwise, insertion/extraction of the splitter body 36 may be made in a direction extending along the leading edge 32 of the splitter 30.

Once inside, the splitter body 36 may extend along a full width of the duct 22. As shown in FIG. 2A, the side plate 37 may close the opening 220 once the splitter body 36 is fully inserted. The side plate 37 and the opening 220 may have a corresponding outline in a least some embodiments. For example, the side plate 37 may mate with the opening 220 upon closing. In embodiments where the handle 38 is present, the handle 38 may serve to engage the splitter body 36 through the side opening 220 or disengage it from the side opening 220. While the side opening 220 is in the form of a hole in the duct 22 in the depicted embodiment, this is only one possibility. Access to the interior of the duct 22 may be obtained by an opening extending along the width of the duct 22 in other cases, in a wall of the duct 22 in the core flow section 24 and/or scavenge flow section 25, for example.

In at least some embodiments, lateral insertion of the splitter body 36 relative to the extent of the duct 22 may facilitate access to the splitter cartridge 35 from an exterior of the IPS duct assembly 20. In embodiments where the IPS duct assembly 20 is part of an aircraft engine, for example, areas around the duct 22 may be cluttered with other engine components.

Figure 3:
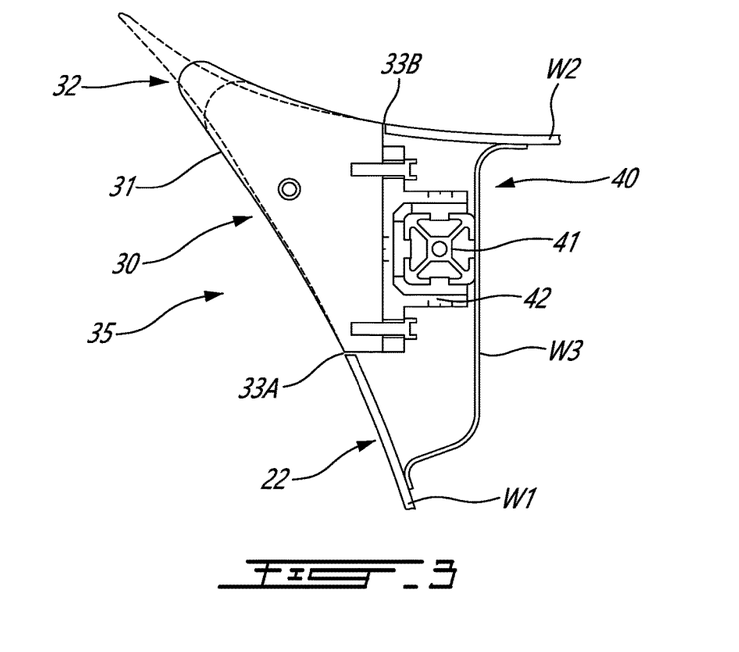
FIG. 3 is a cross-sectional view of the removable splitter assembly of FIGS. 2A-2C.

A mounting assembly adapted to removably mount the splitter cartridge 35 into the duct 22 is shown at 40 in FIG. 3. The mounting assembly 40 includes features on the splitter cartridge 35 and on the duct 22 which cooperate to guide an axial movement of the splitter cartridge 35 in and out of the duct 22 during insertion/extraction. In the depicted embodiment, the mounting assembly 40 defines a guide and rail assembly. As shown, the duct 22 includes a wall, which may be in the form of a duct panel, extending between the walls W1, W2 of the core flow section 25 and scavenge flow section 26, described above. The wall, which will be referred to as a mounting wall W3 for ease of reference, is secured to the walls W1, W2. The wall W3 has a flat surface (or "mounting surface") facing toward the junction 27, though not exposed to the flow during operation. A guide member 41 of the mounting assembly 40 is coupled to the wall W3. In the depicted embodiment, the guide member 41 is a T-slotted rail. Other forms of guide member 41 may be contemplated, such as other types of rails, slots, slides, bracket, etc. The guide member 41 extends longitudinally along the width of the duct 22. Stated otherwise, the guide member 41 extends in the direction of the length L of the splitter body 36. The guide member 41 is fixed relative to the wall W3. The splitter body 36 may move relative to the guide member 41 as the splitter body 36 is being engaged with it.

As shown, the splitter body 36 has a guide member 42 coupled thereto. In the depicted embodiment, the guide member 42 includes a T-slotted bracket. Other forms of guide member 42 may be contemplated, such as other types or rail, slides, bracket, etc., for cooperating with the guide member 41 on the mounting wall W3. The guide member 42 of the splitter cartridge 35 is mounted on a side of the splitter body 36 that is opposite the surface 31 of the splitter 30. The guide member 42 may be coupled in various ways, such as with fasteners. Coupling by molding of the guide member 42 with the splitter body 36 or the guide member 42 being an integral part of the splitter body 36 may be contemplated in some variants. For example, the bracket could be 3-D printed with the splitter body 36 in embodiments where additive manufacturing is involved, or machined in the splitter body 36. In at least some embodiments, the guide members 41, 42 may be in sliding engagement. Other guide and rail assembly allowing relative axial movement of the splitter body 36 relative to the mounting wall W3 may be contemplated. For example, the guide members 41, 42 may define a telescopic slide in some variants.

Figure 4:
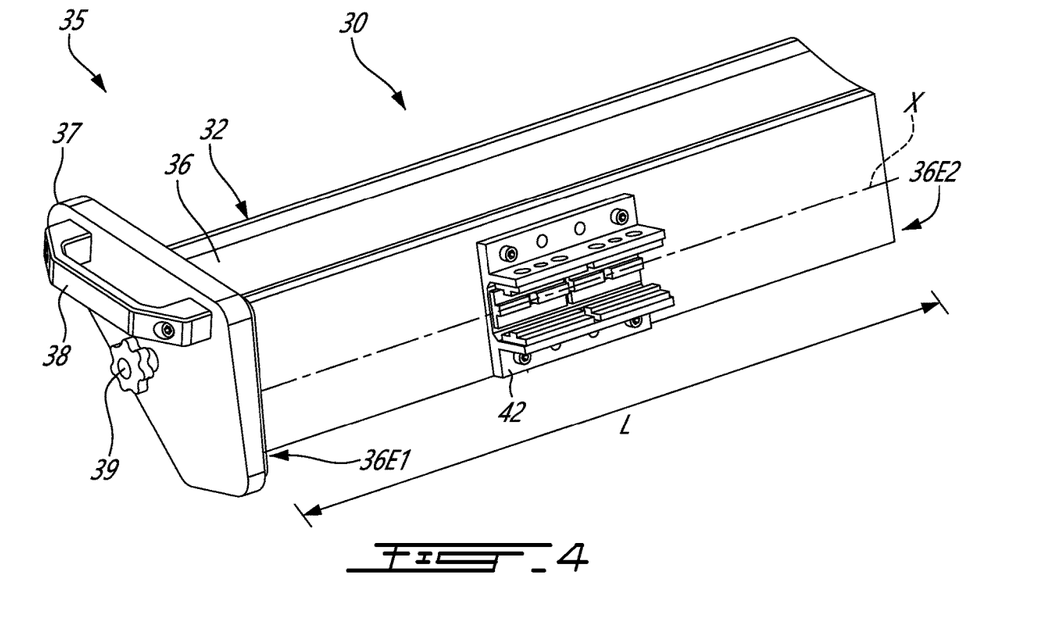
FIG. 4 is a perspective view of the removable splitter assembly of FIG. 3, unmounted from the IPS duct assembly.

As shown FIG. 4, the guide member 42 of the splitter cartridge 35 is secured at a middle length of the splitter body 36. The middle length refers to a position that is equidistant from opposite ends 36E1, 36E2 of the splitter body 36. This is only one possibility, as the guide member 42 could extend along the full length L of the splitter body 36, or located at another relative position in other cases, for example. The guide member 42, here including a T-slotted rail, may allow axial movement along one axis and block movement in other directions. In the depicted embodiment, the T-slotted rail allows axial movement along an axis X along the length L of the splitter body 36, which may be referred to as longitudinal axis X. Transverse movement is prevented (or at least limited), due to engagement of the T-slotted rail with the guide member 41 on the wall W3. As can be seen from FIG. 3, the T-slotted rail cooperate with three faces of the guide member 41 on the wall W3. This arrangement may facilitate alignment and/or reduce the risks of misalignment of the guide members 41, 42 during movement.

It is understood that the guide members 41, 42 including the rail and the bracket may be inverted. Stated otherwise, one of the rail and the bracket may be coupled to the splitter body 36 and the other one of the rail and the bracket may be coupled to the mounting wall W3 of the duct 22.

Figure 5A:
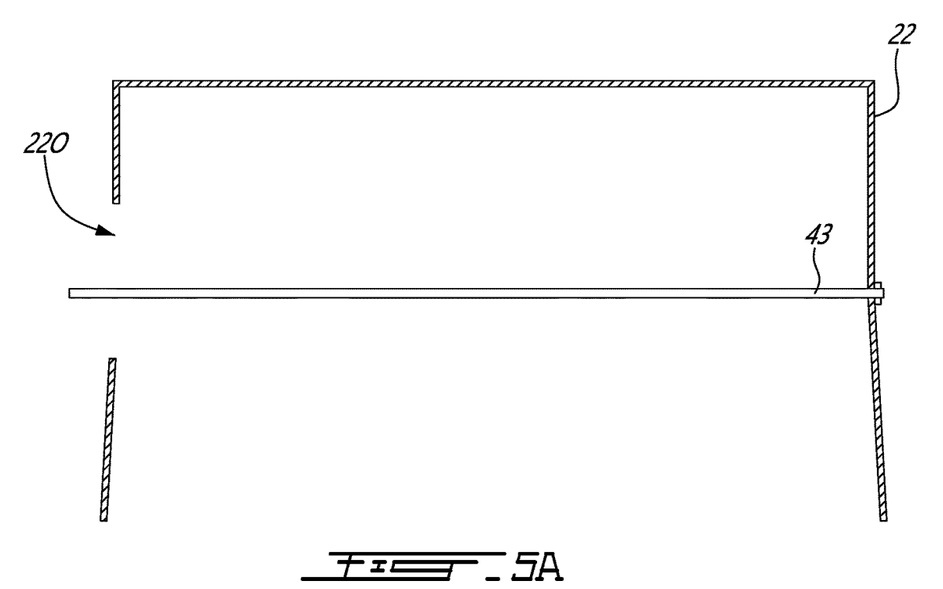
FIG. 5A is a schematic representation of a splitter mounting area of the IPS duct assembly.
Figure 5B:
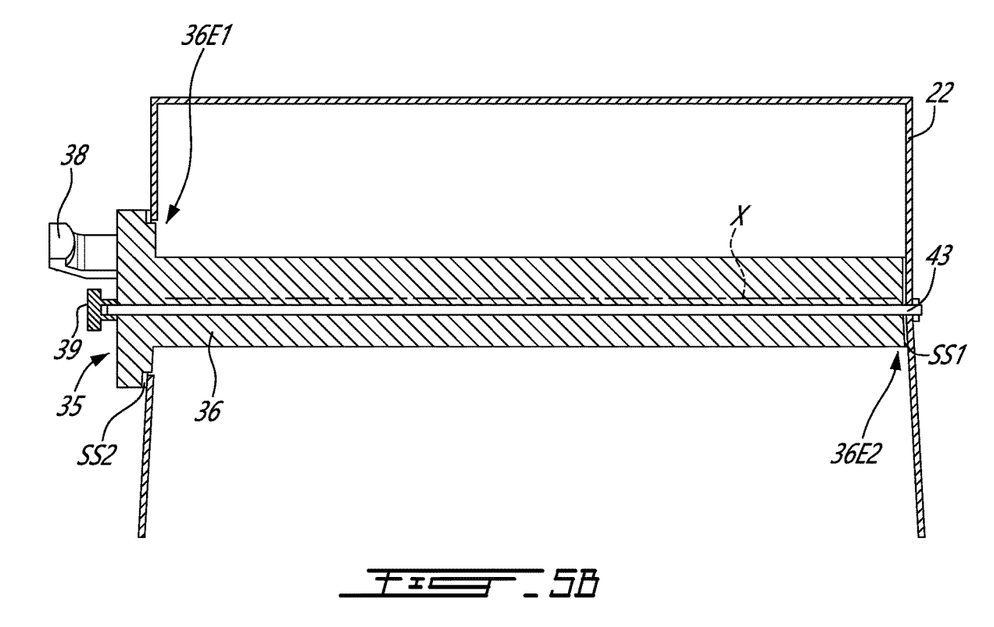
FIG. 5B is another schematic representation of the splitter mounting area of FIG. 5A, showing the removable splitter assembly mounted thereto.

Referring to FIGS. 5-6, in the depicted embodiment, the splitter cartridge 35 may be secured in place once the splitter body 36 is fully inserted into the duct 22. As shown, the mounting assembly 40 includes a rod 43 extending along the width of the duct 22. The rod 43 is secured at one end to a side wall of the duct 22 and extends along the axis X. The rod 43 projects out of the side opening 220 in some embodiments, as shown. In the depicted embodiment, the rod 43 extends through the splitter body 36, from one end 36E1 to the other end 36E2. It is understood that in embodiments where the splitter body 36 is plain, such as shown, the splitter body 36 may include a hole extending along the full length L of the body 36. Such hole may not be present in embodiments where the splitter body is hollowed, for example. In embodiments where the side plate 37 is present, such as shown, the rod 43 may extend through the side plate 37, via a hole therethrough. The rod 43 may cooperate with the knob 39 of the splitter cartridge 35 to secure the splitter cartridge 35 in place. In an embodiment, the rod 43 is a threaded rod (threaded at least partially), and the knob 39 may be in threading engagement with the rod 43.

During installation of the splitter cartridge 35 in the duct 22, the splitter cartridge 35 may be guided in axial engagement with the mounting assembly 40, as described above. The splitter cartridge 35 may receive the rod 43 therethrough as it is being axially displaced. The knob 39 may engage the rod 43, and upon tightening, the splitter cartridge 35 may be secured to the duct 22. The knob 39 may push the end 36E2 of the splitter body 36 against the duct 22 upon tightening. The knob 39 is only an exemplary tightening device, as other tightening devices may be contemplated, such as a lever, switch, clamp, a lock, a threaded nut, for example. The end 36E2 may be in sealing engagement with the duct 22 in at least some embodiments. The end 36E2 of the splitter body 36 may abut against the duct 22 or against a sealing gasket (or "seal SS1"), as shown. A sealing gasket (or "seal SS2") may interface between the duct 22 and the side plate 37 at the other end 36E1. These seals SS1, SS2 may provide greater sealing capability, but are optional. The splitter cartridge 35 may be secured to the duct 22 in other suitable ways, with or without the rod 43 of the depicted embodiment. For example, the splitter cartridge 35 may be guided with a guide and rail assembly, such as that described, and secured to the duct 22 by interlocking features, fasteners, hooks, brackets, etc.

A method of replacing a splitter of an inertial particle separator (IPS) duct assembly including a duct having an inlet section for channeling airflow to a scavenge flow section and a core flow section as the IPS duct assembly 20 described herein is presented. The method includes disengaging a splitter cartridge including the splitter from a side opening of the duct, the side opening located at a junction between the scavenge flow section and the core flow section of the duct merging with the inlet section of the duct. The disengaging may include sliding the splitter cartridge out of engagement from a guide and rail assembly. The disengaging may include pulling on the splitter cartridge in a direction transverse to a direction of the flow in the duct.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An inertial particle separator (IPS) duct assembly adapted to be fluidly connected to an air intake of an engine core of an aircraft engine, comprising:
   a duct having an inlet section extending downstream from an intake flow opening for receiving airflow to a junction, a scavenge flow section having a scavenge flow inlet in communication with the inlet section at the junction, a core flow section having a core flow inlet in communication with the inlet section at the junction, the scavenge flow section and the core flow section splitting from the inlet section at the junction, the scavenge flow section having a scavenge flow outlet downstream of the junction, the core flow section having a core flow outlet downstream of the junction and fluidly connectable to the air intake of the engine core; and
   a splitter cartridge removably mounted at the junction, the splitter cartridge including a splitter body extending between a duct wall of the scavenge flow section and a duct wall of the core flow section, the splitter body having a surface exposed to the airflow at the junction, the surface defining a leading edge of the splitter body extending in a direction transverse to the airflow at the junction.

2. The IPS duct assembly as defined in claim 1, wherein the surface has boundary lines extending there along, the boundary lines are aligned with respective ones of the duct wall of the scavenge flow section and the duct wall of the core flow section.

3. The IPS duct assembly as defined in claim 2, wherein the surface extends continuously from one of the boundary lines to the other one of the boundary lines.

4. The IPS duct assembly as defined in claim 1, wherein the splitter cartridge is mounted to the duct via a mounting assembly including a guide member engageable with the splitter cartridge, the splitter cartridge movable relative to the guide member, the guide member guiding the splitter cartridge in an axial movement of the splitter cartridge relative to the duct, the axial movement extending in the direction transverse to the airflow at the junction.

5. The IPS duct assembly as defined in claim 4, wherein the guide member is one of a rail and a bracket, the mounting assembly including another guide member being the other one of the rail and the bracket, the rail and the bracket in axial engagement along an axis extending along a length of the splitter body, one of the rail and the bracket coupled to the splitter body and the other one of the rail and the bracket coupled to a mounting wall of the duct.

6. The IPS duct assembly as defined in claim 5, wherein the rail and the bracket are in sliding engagement.

7. The IPS duct assembly as defined in claim 5, wherein the mounting wall of the duct extends between the duct wall of the scavenge flow section and the duct wall of the core flow section.

8. The IPS duct assembly as defined in claim 4, wherein the mounting assembly includes a rod secured to the duct, the rod extending through a hole in the splitter body of the splitter cartridge.

9. The IPS duct assembly as defined in claim 1, wherein the splitter cartridge includes a side plate, the splitter body extending from the side plate.

10. The IPS duct assembly as defined in claim 9, wherein the side plate includes a handle.

11. The IPS duct assembly as defined in claim 9, wherein the duct includes a side opening at the junction, the splitter body removably insertable in the duct through the side opening, and wherein the side plate closes the side opening of the duct.

12. The IPS duct assembly as defined in claim 1, wherein the duct includes a side opening at the junction, the splitter body removably insertable in the duct through the side opening.

13. The IPS duct assembly as defined in claim 1, wherein the splitter body extends along a full width of the duct at the junction.

14. The IPS duct assembly as defined in claim 1, wherein the IPS duct assembly includes a sealing gasket interfacing with the duct and the splitter cartridge.

* * * * *